United States Patent
Nguyen et al.

(10) Patent No.: US 6,668,926 B2
(45) Date of Patent: Dec. 30, 2003

(54) METHODS OF CONSOLIDATING PROPPANT IN SUBTERRANEAN FRACTURES

(75) Inventors: Philip D. Nguyen, Duncan, OK (US); Johnny A. Barton, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 37 days.

(21) Appl. No.: 10/041,142

(22) Filed: Jan. 8, 2002

(65) Prior Publication Data

US 2003/0131998 A1 Jul. 17, 2003

(51) Int. Cl.⁷ .............................................. E21B 43/02
(52) U.S. Cl. ...................................... 166/280; 166/281
(58) Field of Search .............................. 166/280, 281, 166/295, 308

(56) References Cited

U.S. PATENT DOCUMENTS

| | | | |
|---|---|---|---|
| 4,042,032 A | 8/1977 | Anderson et al. ............ | 166/276 |
| 4,070,865 A | 1/1978 | McLaughlin ................. | 61/36 C |
| 4,074,760 A | 2/1978 | Copeland et al. ............ | 166/276 |
| 4,336,842 A | 6/1982 | Graham et al. .............. | 166/276 |
| 4,829,100 A | 5/1989 | Murphey et al. ............. | 523/131 |
| 5,128,390 A | 7/1992 | Murphey et al. ............. | 523/130 |
| 5,381,864 A | 1/1995 | Nguyen et al. .............. | 166/280 |
| 5,393,810 A | 2/1995 | Harris et al. ................. | 524/56 |
| 5,529,123 A | 6/1996 | Carpenter et al. ........... | 166/293 |
| 5,609,207 A | 3/1997 | Dewprashad et al. ........ | 166/276 |
| 5,839,510 A | 11/1998 | Weaver et al. ............... | 166/276 |
| 5,916,933 A  * | 6/1999 | Johnson et al. .............. | 523/208 |
| 5,921,317 A | 7/1999 | Dewprashad et al. ........ | 166/208 |
| 5,924,488 A | 7/1999 | Nguyen et al. .............. | 166/280 |
| 5,960,880 A | 10/1999 | Nguyen et al. .............. | 166/280 |
| 6,003,600 A | 12/1999 | Nguyen et al. .............. | 166/281 |
| 6,016,870 A | 1/2000 | Dewprashad et al. ........ | 166/295 |
| 6,311,773 B1 | 11/2001 | Todd et al. ................... | 166/280 |
| 2002/0048676 A1  * | 4/2002 | McDaniel et al. ........... | 428/404 |

OTHER PUBLICATIONS

S. W. Almond et al., "Factors Affecting Proppant Flowback With Resin Coated Proppants," SPE 30096 (1995 European Formation Damage Conference, May 15–16, 1995).

* cited by examiner

*Primary Examiner*—William Neuder
(74) *Attorney, Agent, or Firm*—Robert A. Kent; C. Clark Dougherty, Jr.

(57) ABSTRACT

Improved methods of coating dry proppant particles with a hardenable resin composition, suspending the coated proppant particles in a fracturing fluid and consolidating the proppant particles after being placed in fractures into high strength permeable masses are provided. As the fractures are formed, a liquid hardenable resin component is continuously mixed with a liquid hardening agent component on-the-fly to form a hardenable resin composition. The hardenable resin composition is continuously coated onto dry proppant particles conveyed from a source thereof on-the-fly to form resin composition coated proppant particles, and the resin composition coated proppant particles are continuously suspended in the fracturing fluid on-the-fly.

37 Claims, No Drawings

METHODS OF CONSOLIDATING PROPPANT IN SUBTERRANEAN FRACTURES

BACKGROUND OF THE INVENTION

1. Field of the Invention

The present invention relates to improved methods of consolidating proppant in subterranean fractures formed by a gelled liquid fracturing fluid.

2. Description of the Prior Art

Hydrocarbon producing wells are often stimulated by hydraulic fracturing treatments. In hydraulic fracturing treatments, a viscous fracturing fluid which also functions as a carrier fluid is pumped into a producing zone to be fractured at a rate and pressure such that one or more fractures are formed in the zone. Particulate solids, e.g., graded sand, for propping the fractures, commonly referred to in the art as "proppant" are suspended in a portion of the fracturing fluid so that the particulate solids are deposited in the fractures when the fracturing fluid is broken. That is, a breaker is included in the fracturing fluid whereby the fracturing fluid reverts to a thin fluid which is returned to the surface. The proppant deposited in the fractures functions to prevent the fractures from closing so that conductive channels are formed through which produced hydrocarbons can readily flow.

In order to prevent the subsequent flow-back of proppant as well as loose or incompetent sand in the fractured zone with fluids produced therefrom, a portion of the proppant introduced into the fractures has heretofore been coated with a hardenable resin composition which is caused to harden and consolidate the proppant particles in the zone. Typically, the resin composition coated proppant is deposited in the fractures after a large quantity of uncoated proppant has been deposited therein. That is, the last portion of the proppant deposited in each fracture, referred to in the art as the "tail-end" portion, is coated with the hardenable resin composition. When the viscous fracturing fluid which is the carrier fluid for the proppant is broken and reverts to a thin fluid as described above, the resin coated proppant is deposited in the fractures and the fractures close on the proppant. The partially closed fractures apply pressure on the resin coated proppant particles whereby the particles are forced into contact with each other while the resin composition hardens. It has heretofore been thought that the hardening of the resin composition under pressure brings about the consolidation of the resin coated proppant particles into a hard permeable pack having sufficient compressive and tensile strengths to prevent unconsolidated proppant and formation sand from flowing out of the fractures with produced fluids. However, it has been found that as the fracturing fluid containing proppant without a hardenable resin composition coating thereon is carried into the fractures by the fracturing fluid, some of the proppant is continuously deposited in the bottom of the fractures adjacent to the well bore. This unconsolidated accumulation of non-resin coated proppant remains in the fractures adjacent to the well bore and when the resin coated proppant enters the fractures at the end of the proppant deposit, it does not displace the uncoated proppant at the bottom of the fractures. Instead, the resin coated proppant flows over the uncoated proppant. This results in unconsolidated proppant at the bottom of the fractures adjacent to the well bore. During the subsequent production of formation fluids through the propped fractures, the unconsolidated proppant at the bottom of the fractures flows back with the formation fluids. The flow-back of the proppant with the formation fluids is very detrimental in that it erodes metal goods, plugs piping and vessels and causes damage to valves, instruments and other production equipment.

Thus, there are needs for improved methods of consolidating proppant particles in subterranean fractures whereby all of the proppant particles are consolidated into high strength permeable packs in the fractures which do not permit the flow-back of proppant, formation sand and the like.

SUMMARY OF THE INVENTION

The present invention provides improved methods of coating dry proppant particles with a resin composition and suspending the coated proppant particles in a fracturing fluid. The resin composition hardens and consolidates the resin coated proppant particles into high strength permeable packs in fractures formed in subterranean zones which do not allow proppant flow-back. The methods are basically comprised of the following steps. A liquid hardenable resin component is provided comprised of a hardenable resin, a silane coupling agent, a solvent for the resin, a hydrolyzable ester for breaking gelled fracturing fluid films on the proppant particles, and a surfactant facilitating the coating of the resin on the proppant particles and for causing the hardenable resin to flow to the contact points between adjacent resin coated proppant particles so that the particles are consolidated into a high strength permeable mass. A liquid hardening agent component is provided comprised of a hardening agent suspended or dissolved in a liquid carrier fluid. In addition, a source of dry proppant particles and a gelled liquid fracturing fluid are provided. The gelled liquid fracturing fluid is pumped into a subterranean zone to form one or more fractures therein and to place resin composition coated proppant particles in the fractures. As the fractures are formed by the fracturing fluid, the liquid hardenable resin component is mixed with the liquid hardening agent component to form a resin composition. The resin composition is continuously coated on dry proppant particles conveyed from the source of the dry proppant particles. The resulting resin composition coated proppant particles are continuously mixed with the fracturing fluid whereby the resin composition coated proppant particles are suspended in the fracturing fluid and are deposited in the one or more fractures formed wherein they are caused to harden and consolidate into a high strength permeable pack which prevents proppant flow-back. When the resin composition coated proppant particles have been placed in the one or more fractures, the pumping of the fracturing fluid, the mixing of the liquid hardenable resin component with the liquid hardening agent component, the coating of the dry proppant particles with the resin composition and the mixing of the resin composition coated proppant particles with the fracturing fluid are terminated. The hardenable resin composition on the coated proppant particles is allowed to harden and to consolidate the proppant into one or more high strength permeable packs which prevent proppant flow-back.

Another improved method of the present invention for coating dry proppant particles with a resin composition and suspending the coated proppant particles in a fracturing fluid whereby the resin coated proppant particles are placed in one or more fractures formed in a subterranean zone by the fracturing fluid is comprised of the following steps. A liquid hardenable resin component as described above and a liquid hardening agent component as described above are provided along with a source of dry proppant particles and a gelled liquid fracturing fluid. The gelled liquid fracturing fluid is pumped into the subterranean zone to form one or more fractures therein and to place the resin composition coated proppant particles in the fractures. The liquid hardenable resin component is continuously mixed with the liquid hardening agent component to form a resin composition. The volume ratio of the liquid hardening agent component to the liquid hardenable resin component is varied from an initial volume ratio to a lower volume ratio and then back to the initial volume ratio in order to consolidate all of the proppant particles in the fractures while conserving the amount of the liquid hardening agent component used. The resin composition is continuously coated onto dry proppant particles conveyed from the source thereof to form resin composition coated proppant particles. The resin composition coated proppant particles are continuously mixed with the fracturing fluid so that the resin composition coated proppant particles are continuously deposited in the fractures. Thereafter, the pumping of the fracturing fluid into the subterranean zone, the mixing of the liquid hardenable resin component with the liquid hardening agent component, the coating of the resin composition onto the dry proppant particles to form resin composition coated proppant particles and the mixing of the resin composition coated proppant particles with the fracturing fluid are terminated. The hardenable resin composition on the coated proppant particles is allowed to harden and to consolidate the proppant into one or more high strength permeable packs which prevent proppant flow-back.

It is, therefore, a general object of the present invention to provide improved methods of consolidating proppant in subterranean fractures.

Another object of the present invention is the provision of an improved method of coating dry proppant particles with a resin composition and suspending the coated proppant particles in a fracturing fluid whereby the proppant particles are deposited in one or more fractures in a subterranean zone and are consolidated into a hard permeable mass having high strength which prevents proppant flow-back.

Other and further objects, features and advantages of the present invention will be readily apparent to those skilled in the art upon a reading of the description of preferred embodiments which follows.

DESCRIPTION OF PREFERRED EMBODIMENTS

As mentioned above, the prior art methods of consolidating proppant in subterranean fractures have generally included the placement of a large quantity of uncoated proppant in the fractures followed by a tail-end portion of proppant coated with a hardenable resin composition. When the viscous fracturing fluid which is the carrier for the proppant is broken and reverts to a thin fluid, the resin coated proppant is deposited in the fractures. The tail-end portion of the resin coated proppant is consolidated into a hard permeable mass by the resin composition, but the uncoated proppant previously deposited in the bottom of the fractures as the large quantity of uncoated proppant was transported into the fractures is not consolidated. As a result, when the well is placed on production, flow-back of the uncoated proppant takes place.

Another problem which is encountered in consolidating the proppant to prevent flow-back involves the strength of the consolidated resin coated proppant packs in the fractures. Heretofore, it has been a common practice to utilize proppant that is precoated with a resin composition and stored. When the precoated proppant is required for use at a job site, it is transported to the job site. While such precoated resin coated proppant is consolidated after being placed by a hardening agent, the resulting consolidated proppant pack often does not have enough strength to prevent deterioration and proppant flow-back.

In accordance with the present invention, all of the proppant transported into the fractures is coated with a resin composition on-the-fly as the fracturing fluid is pumped into the well bore and into the fractures. As a result, the resin coating on the proppant is fresh and when it hardens and consolidates the proppant, high strength permeable proppant packs are formed in the fractures which prevent proppant flow-back. As will be described further hereinbelow, in order to conserve the amount of hardening agent utilized for curing the hardenable resin which has been deposited on all of the proppant in the fractures, the volume ratio of liquid hardening agent component to liquid hardenable resin component utilized in accordance with this invention is varied. In a preferred technique, the volume ratio of the liquid hardening agent component to the liquid hardenable resin component is varied from an initial volume ratio at the beginning of the proppant suspended in the fracturing fluid to a lower volume ratio as the middle portion of the proppant is suspended in the fracturing fluid and then back to the initial volume ratio at the end portion of the proppant suspended in the fracturing fluid. This technique results in consolidated proppant packs in the fractures which have high strength at the forward ends of the packs, less strength at the middle portions of the packs and high strength at the end portions of the packs. The middle portions of the packs tend to be placed deeply in the fractures far away from the well bore. Since all of the proppant is consolidated, there is no unconsolidated proppant remaining in the bottoms of the fractures and as a result proppant flow-back does not occur.

In accordance with the improved methods of this invention, dry proppant particles are coated with a resin composition on-the-fly, the coated proppant particles are suspended in the fracturing fluid on-the-fly and the resulting hardenable resin composition coated proppant particles are placed in one or more fractures formed in a subterranean zone. Such methods are basically comprised of the following steps. A liquid hardenable resin component is provided comprised of a hardenable resin, a silane coupling agent, a solvent for the resin, a hydrolyzable ester for breaking gelled fracturing fluid films on the proppant particles, and a surfactant for facilitating the coating of the resin on the proppant particles and causing the hardenable resin to flow to the contact points between adjacent resin coated proppant particles so that the particles are consolidated into a high strength permeable mass. A liquid hardening agent component is provided comprised of a hardening agent suspended or dissolved in a liquid carrier fluid. In addition, dry proppant particles and a gelled liquid fracturing fluid are provided. The gelled liquid fracturing fluid is continuously pumped into a subterranean zone to form one or more fractures therein and to place the resin composition coated proppant particles in the fractures. As the fractures are formed by the fracturing fluid, the liquid hardenable resin component is continuously mixed with the liquid hardening agent component on-the-fly to form the resin composition. The resin composition is continuously coated on the dry proppant particles which are conveyed from the source thereof on-the-fly to form resin composition coated proppant particles. The resin composition coated proppant particles are continuously mixed with the fracturing fluid on-the-fly whereby the resin composition coated proppant particles are suspended therein. Thereafter, the resin composition coated proppant particles are carried into the fractures whereupon the pumping of the fracturing fluid and other related steps are terminated. As is well understood by those skilled in the art, the gelled liquid fracturing fluid can include a breaker which causes it to revert to a thin fluid so that the resin composition coated proppant particles are deposited in the fractures and the fracturing fluid is returned to the surface.

The term "on-the-fly" is used herein to mean that a flowing stream is continuously introduced into another flowing stream so that the streams are combined and mixed while continuing to flow as a single stream. As is also well understood, when the fracturing fluid is broken and the resin composition coated proppant particles are deposited in the fractures formed, the fractures close on the proppant particles. The partially closed fractures apply pressure on the resin composition coated proppant whereby the proppant particles are forced into contact with each other while the resin composition hardens. The hardening of the resin composition under pressure helps bring about the consolidation of the resin coated particles into a hard permeable pack having sufficient compressive strength to prevent unconsolidated proppant and formation sand from flowing out of the fractures with produced fluids. As is also understood, in fracture treatments carried out in unconsolidated formations, good consolidation of proppant is required in the perforations which extend from the inside of the well bore through casing and cement into the unconsolidated formation as well as in the fractured portions of the unconsolidated formation surrounding the well bore. The tail-end portion of the proppant which is deposited in the perforations and in the fractures is coated with a hardenable resin composition and is caused to harden. The resulting consolidated proppant in the perforations and fractures contributes to the prevention of proppant flow-back. However, there is often little closure pressure applied to the resin coated proppant in the fractures close to the well bore and there is no closure pressure applied to the resin coated proppant particles in the perforations. In addition, the resin coated proppant particles can be separated from each other by films of the gelled fracturing fluid and because of the presence of the fracturing fluid films, the proppant particles do not sufficiently consolidate. As a result, the consolidated permeable packs formed in the perforations and fractures often have less than sufficient compressive strength to prevent unconsolidated proppant and formation sand from flowing out of the perforations and fractures. These problems are solved by including one or more hydrolyzable esters which function to break gelled fracturing fluid films on the particles, and a surfactant for facilitating the coating of the resin composition on the proppant particles and for causing the hardenable resin to flow to the contact points between adjacent resin coated proppant particles so that the particles are consolidated into a high strength permeable mass.

As mentioned above, in accordance with the present invention all of the proppant particles are coated with the liquid hardenable resin composition. In order to conserve the liquid hardening agent component used and to reduce the cost of the fracturing procedure, the volume ratio of the liquid hardening agent component can be varied. That is, in a preferred technique, the volume ratio of the liquid hardening agent component to the liquid hardenable resin component is varied from an initial volume ratio which produces a high strength permeable pack to a lower volume ratio which produces a lower strength resilient permeable pack and then back to the initial volume ratio which produces a high strength permeable pack adjacent to the well bore. As mentioned, because all of the proppant particles are coated with the liquid hardening agent component, there is no unconsolidated proppant particles in the bottoms of the fracture and consequently, the consolidated permeable pack does not allow flow-back to occur. The initial volume ratio of the liquid hardening agent component to the liquid hardenable resin component is generally in the range of from about 1:100 to about 1:2 and the lower volume ratio is in the range of from 0 to about 1:5. Preferably, the initial volume ratio of the liquid hardening agent component to the liquid hardenable resin component is about 1:2 and the lower volume ratio is about 1:10.

Thus, another method of the present invention includes the following steps. A liquid hardenable resin component is provided comprised of a hardenable resin, a silane coupling agent, a solvent for the resin, one or more hydrolyzable esters for breaking gelled fracturing fluid films on the proppant particles, and a surfactant for facilitating the coating of the resin on the proppant particles and for causing the hardenable resin to flow to the contact points between adjacent resin coated proppant particles. A liquid hardening agent component is provided comprised of a hardening agent suspended or dissolved in a liquid carrier fluid. In addition, a source of dry proppant particles and a gelled liquid fracturing fluid are provided. The gelled liquid fracturing fluid is pumped into the subterranean zone to form one or more fractures therein and to place the resin composition coated proppant particles in the fractures. As the fractures are formed the liquid hardenable resin component is continuously mixed with the liquid hardening agent component on-the-fly to form the resin composition. The volume ratio of the liquid hardening agent component to the liquid hardenable resin component is varied, and the resin composition produced is continuously coated onto dry proppant particles conveyed from the source thereof on-the-fly to form resin composition coated proppant particles. The resin composition coated proppant particles are continuously mixed with the fracturing fluid being pumped on-the-fly whereby the resin composition coated proppant particles are suspended therein. After the resin composition coated proppant particles have been placed in one or more fractures formed in the subterranean zone, the pumping of the gelled liquid fracturing fluid and other related steps are terminated. Thereafter, the gelled liquid fracturing fluid breaks into a thin fluid, the resin composition coated proppant particles are deposited in the fractures and the resin composition hardens and consolidates the proppant particles in one or more fractures into high strength permeable packs which do not allow proppant flow-back.

Examples of hardenable resins which can be utilized in the liquid hardenable resin component include, but are not limited to, organic resins such as bisphenol A-epichlorohydrin resin, polyepoxide resin, novolak resin, polyester resin, phenol-aldehyde resin, urea-aldehyde resin, furan resin, urethane resin and mixtures thereof. Of these, bisphenol A-epichlorohydrin resin is preferred. The organic resin utilized is included in the liquid hardenable resin component in an amount in the range of from about 50% to about 90% by weight of the liquid hardenable resin component, preferably an amount of about 85%.

Examples of silane coupling agents which can be used include, but are not limited to, N-2-(aminoethyl)-3-aminopropyltrimethoxysilane and 3-glycidoxypropyltrimethoxysilane. Of these, 3-glycidoxypropyltrimethoxysilane is preferred. The silane coupling agent is included in the liquid hardenable resin component in an amount in the range of from 0% to about 5% by weight of the liquid hardenable resin component, preferably in an amount of about 2%.

Examples of solvents for the organic resin and silane coupling agent in the liquid hardenable resin component include, but are not limited to, methanol, butyl alcohol and N-methyl-2-pyrrolidone. Of these, methanol is preferred. The amount of the solvent utilized in the liquid hardenable resin component is in the range of from about 1% to about 10% by weight of the liquid hardenable resin component, preferably in an amount of about 5%.

Examples of hydrolyzable esters utilized in the liquid hardenable component for facilitating the coating of the resin composition on the proppant particles and for breaking gelled fracturing fluid films thereon, include, but are not limited to, a mixture of dimethylglutarate, dimethyladipate and dimethylsuccinate, sorbitol, catechol, dimethylthiolate and ter butylhydroperoxide. Of these, a mixture dimethylglutarate, dimethyladipate and dimethylsuccinate is preferred. The hydrolyzable ester is present in the liquid hardenable component in an amount in the range of from about 0.2% to about 2 percent by weight of the liquid hardenable resin component, preferably in an amount of about 1.2%.

The surfactants which can be utilized in the liquid hardenable resin component for facilitating the coating of the resin on the proppant particles, and for causing the hardenable resin to flow to the contact points between adjacent resin coated proppant particles include, but are not limited to, an ethoxylated nonyl phenol phosphate ester and mixtures of one or more cationic surface active agents and one or more non-ionic surface active agents. Such mixtures are described in U.S. Pat. No. 6,311,733 issued to Todd et al. on Nov. 6, 2001 which is incorporated herein by reference. An ethoxylated nonyl phenol phosphate ester is preferred. The surfactant or surfactants utilized are included in the liquid hardenable resin component in an amount in the range of from about 1% to about 15% by weight of the liquid hardenable resin component, preferably in an amount of about 8%.

The liquid hardening agent component is comprised of a hardening agent and a liquid carrier fluid. Examples of hardening agents that can be used include, but are not limited to, 4,4'-diaminodiphenyl sulfone, amines, amides, hexachloroacetone, 1,1,3-trichlorotrifluoroacetone, benzotrichloride, benzylchloride and benzalchloride. Of these, 4,4'-diaminodiphenyl sulfone is preferred.

The hardening agent is included in the liquid hardening agent component in an amount in the range of from about 20% to about 70% by weight of the liquid hardening agent component, preferably in an amount of about 45%.

The liquid carrier fluid in the liquid hardening agent component is an aqueous liquid. A preferred aqueous liquid carrier fluid is a xanthan polymer gelled aqueous liquid. The aqueous liquid is present in the liquid hardening agent component in an amount in the range of from about 30% to about 80% by weight of the liquid hardening agent component, preferably in an amount of about 55%.

As mentioned above, during the time that the liquid hardenable resin component and the liquid hardening agent component are continuously mixed and coated on the dry proppant particles on-the-fly, the rate of the liquid hardening agent component can be varied while the rate of the liquid hardenable resin component is held constant. Stated another way, the volume ratio of the liquid hardening agent component to the liquid hardenable resin component is varied.

Preferably, the volume ratio of the liquid hardening agent component to the liquid hardenable resin component is varied from an initial volume ratio to a lower volume ratio and then back to the initial volume ratio. This procedure causes all of the proppant particles to be consolidated with the proppant particles adjacent to the well bore and the proppant particles at the front of the fracture being strongly consolidated and the proppant particles between the ends of the fracture being moderately consolidated. This arrangement effectively prevents proppant flow-back. The procedure is based on the discovery that reductions in the amount of the liquid hardening agent component from the amount that produces a very hard and strong cured resin causes the resin to become more rubbery or flexible but it still functions to consolidate the proppant particles. Thus, the middle portion of a consolidated proppant particle pack in a fracture can be resilient and have less compressive strength so long as the end portions of the pack are consolidated with high strength rigid resin.

A variety of fracturing fluids can be utilized in accordance with the present invention including aqueous gels, emulsions and other fluids utilized for forming fractures in subterranean zones and carrying resin composition coated proppant particles into the fractures. The aqueous gels are generally comprised of water and one or more gelling agents. The emulsions can be comprised of two immiscible liquids such as an aqueous gelled liquid and a liquefied, normally gaseous fluid, such as carbon dioxide.

The preferred fracturing fluids for use in accordance with this invention are aqueous gels comprised of water, a gelling agent for gelling the water and increasing its viscosity, and optionally, a cross-linking agent for cross-linking the gel and further increasing the viscosity of the fluid. The increased viscosity of the gelled or gelled and cross-linked fracturing fluid reduces fluid loss and allows the fracturing fluid to transport significant quantities of suspended resin composition coated proppant particles. The water utilized to form the fracturing fluid can be fresh water, salt water, brine or any other aqueous liquid which does not adversely react with other components utilized in accordance with this invention.

A variety of gelling agents can be utilized including hydratable polymers which contain one or more functional groups such as hydroxyl, cis-hydroxyl, carboxyl, sulfate, sulfonate, amino or amide. Particularly useful such polymers are polysaccharides and derivatives thereof which contain one or more of the monosaccharide units galactose, mannose, glucoside, glucose, xylose, arabinose, fructose, glucuronic acid or pyranosyl sulfate. Examples of natural hydratable polymers containing the foregoing functional groups and units which are particularly useful in accordance with the present invention include guar gum and derivatives thereof such as hydroxypropyl guar and cellulose derivatives such as hydroxyethyl cellulose. Hydratable synthetic polymers and copolymers which contain the above mentioned functional groups can also be utilized. Examples of such synthetic polymers include, but are not limited to, polyacrylate, polymethacrylate, polyacrylamide, polyvinyl alcohol and polyvinylpyrrolidone. The gelling agent used is generally combined with water in an amount in the range of from about 0.1% to about 1% by weight of the water.

Examples of cross-linking agents which can be utilized to further increase the viscosity of a gelled fracturing fluid are alkali metal borates, borax, boric acid and compounds which are capable of releasing multivalent metal ions in aqueous solutions. Examples of the multivalent metal ions are chromium, zirconium, antimony, titanium, iron, zinc or aluminum. When used, the cross-linking agent is generally added to the gelled water in an amount in the range of from about 0.01% to about 1% by weight of the water.

The above described gelled or gelled and cross-linked fracturing fluids typically also include internal delayed gel breakers such as those of the enzyme type, the oxidizing type, the acid buffer type and the temperature activated type, all of which are well known to those skilled in the art. The gel breakers cause the viscous carrier fluids to revert to thin fluids that can be produced back to the surface after they have been used to place proppant particles in subterranean fractures. The fracturing fluids can also include one or more of a variety of well known additives such as gel stabilizers, fluid loss control additives, clay stabilizers, bacteriacides and the like.

The proppant particles utilized in accordance with the present invention are generally of a size such that formation particulate solids which migrate with produced fluids are prevented from being produced from the subterranean zone. Various kinds of proppant can be utilized including graded sand, bauxite, ceramic materials, glass materials and the like. Generally, the proppant particles have a size in the range of from about 2 to about 400 mesh, U.S. Sieve Series. The preferred proppant is graded sand having a particle size in the range of from about 10 to about 70 mesh, U.S. Sieve Series. Preferred sand particle size distribution ranges are one or more of 10–20 mesh, 20–40 mesh, 40–60 mesh or 50–70 mesh, depending on the particular size and distribution of formation solids to be screened out by the consolidated proppant particles.

A preferred improved method of this invention for coating dry proppant particles with a hardenable resin composition and suspending the coated proppant particles in a fracturing fluid, the resin composition hardening and consolidating the resin coated proppant particles into a high strength permeable mass which prevents proppant flow-back after being placed in one or more fractures in a subterranean zone comprising the steps of: (a) providing a liquid hardenable resin component comprised of a hardenable resin, a silane coupling agent, a solvent for the resin, one or more hydrolyzable esters for breaking gelled fracturing fluid films on the proppant particles, and a surfactant for facilitating the coating of the resin on the proppant particles and for causing the hardenable resin to flow to the contact points between adjacent resin coated proppant particles; (b) providing a liquid hardening agent component comprised of a hardening agent suspended or dissolved in a liquid carrier fluid; (c) providing a source of dry proppant particles; (d) providing a gelled liquid fracturing fluid; (e) pumping the gelled liquid fracturing fluid into the subterranean zone to form the one or more fractures therein and to place the hardenable resin composition coated proppant particles in the fractures; (f) as the fractures are formed in step (e), continuously mixing the liquid hardenable resin component with the liquid hardening agent component on-the-fly to form the hardenable resin composition; (g) continuously coating the hardenable resin composition produced in step (f) onto dry proppant particles conveyed from the source thereof on-the-fly to form resin composition coated proppant particles; (h) continuously mixing the resin composition coated proppant particles produced in step (g) with the fracturing fluid pumped in accordance with step (e) on-the-fly whereby the resin composition coated proppant particles are suspended therein; (i) terminating steps (e), (f), (g) and (h) when the resin composition coated proppant particles have been placed in the one or more fractures; and (j) allowing the hardenable resin composition on the resin composition coated proppant particles to harden and consolidate the proppant particles into one or more high strength permeable packs which prevent proppant flow-back.

Another preferred improved method of coating dry proppant particles with a hardenable resin composition and suspending the coated proppant particles in a fracturing fluid, the resin composition hardening and consolidating the resin coated proppant particles into a high strength permeable mass which prevents proppant flow-back after being placed in one or more fractures formed in a subterranean zone comprising the steps of: (a) providing a liquid hardenable resin component comprised of a hardenable resin, a silane coupling agent, a solvent for the resin, one or more hydrolyzable esters for breaking gelled fracturing fluid films on the proppant particles, and a surfactant for facilitating the coating of the resin on the proppant particles and for causing the hardenable resin to flow to the contact points between adjacent resin coated proppant particles; (b) providing a liquid hardening agent component comprised of a hardening agent suspended or dissolved in a liquid carrier fluid; (c) providing a source of dry proppant particles; (d) providing a gelled liquid fracturing fluid; (e) pumping the gelled liquid fracturing fluid into the subterranean zone to form the one or more fractures therein and to place the resin composition coated proppant particles in the fractures; (f) as the fractures are formed in step (e), continuously mixing the liquid hardenable resin component with the liquid hardening agent component on-the-fly to form the hardenable resin composition; (g) varying the volume ratio of the liquid hardening agent component to the liquid hardenable resin component during step (f); (h) continuously coating the hardenable resin composition produced in steps (f) and (g) onto dry proppant particles conveyed from the source thereof on-the-fly to form resin composition coated proppant particles; (i) continuously mixing the resin composition coated proppant particles produced in step (h) with the fracturing fluid pumped in accordance with step (e) on-the-fly whereby the resin composition coated proppant particles are suspended therein; (j) terminating steps (e), (f), (g), (h) and (i) when the resin composition coated proppant particles have been placed in the one or more fractures; and (k) allowing the hardenable resin composition on the resin composition coated proppant particles to harden and consolidate the proppant particles into one or more high strength permeable packs which prevent proppant flow-back.

In order to further illustrate the methods of the present invention, the following examples are given.

EXAMPLE 1

To determine the effect of resin concentration on the consolidation strengths of proppant packs, bauxite proppant was dry coated with various amounts of mixed resin compositions. The concentration is expressed in terms of weight percent of proppant. After dry coating with the mixed resin, the proppant was mixed with a cross-linked 30 pound per 1,000 gallon linear carboxymethyl guar fracturing fluid, poured into a consistometer, stirred for 60 minutes at 175° F. to simulate pumping, transferred to flow cells, packed, and cured in an oven at 300° F. for 3 hours with and without 500-psi closure stress. A consistometer is a device designed to stir a solid containing slurry at a desired temperature. After curing, the flow cells were removed from the oven and allowed to cool to less than 100° F. The flow cells were then connected to a tap water faucet for flow back tests to determine how much proppant would be released from the cured pack and flow-back with the water. The water flow rate was steadily increased from 0 to more than 10 liters/minute (i.e., the maximum flow rate of the faucet). The flow cell had a 0.5-inch diameter perforation. After the flow-back testing, the consolidated proppant cores were removed from the flow cells and prepared for unconfined compressive strength measurements (Table I).

TABLE I

Effect Of Resin Concentration On Consolidation And Flow-Back

| Resin Concentration on Proppant, % by Weight of Resin Coated Proppant | Unconfined Compressive Strength Without Closure Pressure, psi | Unconfined Compressive Strength With Closure Pressure, psi | Proppant Flow-Back Amount, grams |
|---|---|---|---|
| 1 | 51 | 150 | None |
| 2 | 1088 | 1194 | None |
| 3 | 1474 | 1585 | None |
| 3 (Repeat) | 1536 | 1786 | None |

EXAMPLE 2

To determine the effect of cure time on the consolidation strength of proppant packs, bauxite proppant was dry coated with a resin composition using a concentration of 2% by weight of proppant. After dry coating with the resin, the proppant was mixed with a cross-linked 30 pound per gallon linear carboxymethyl guar fracturing fluid, poured into the consistometer, stirred for 60 minutes at 175° F. to simulate pumping, transferred to flow cells, packed, and cured in oven at 300° F. for 1, 2, 4 and 16 hours without closure stress. After curing, the proppant packed cores were obtained from the flow cells for unconfined compressive strength measurements (Table II).

TABLE II

Effect Of Cure Time On Consolidation

| Cure Time, hrs | Unconfirmed Compressive Strength, psi |
|---|---|
| 1 | 245 |
| 2 | 980 |
| 4 | 1230 |
| 16 | 1200 |

EXAMPLE 3

To determine the effect of simulated pump time on the consolidation strength, bauxite proppant was dry coated with a resin composition at a concentration of 3% by weight of proppant. After dry coating with the resin, the proppant was mixed with a cross-linked 30 pound per 1,000 gallon linear carboxymethyl guar fracturing fluid which was poured into a consistometer. Various stir periods were used at 175° F. to simulate pumping after which portions of the fracturing fluid were transferred to flow cells, packed, and cured in an oven at 300° F. for 3 hours with and without 500-psi closure stress. After curing, the cured proppant pack cores were removed from the flow cells for unconfined compressive strength measurements (Table III).

TABLE III

Effect Of Simulated Pump Time On Consolidation

| Test No. | Description Of Test | Unconfined Compressive Without Closure Pressure, psi | Unconfined Compressive Strength With Closure Pressure, psi |
|---|---|---|---|
| 1 | Stirred in consistometer for 30 min. at 175° F. Stopped stirring and remained at 175° F. for 3 hours. Packed cross-linked slurry into flow cells and cured at 300° F. for 3 hours without closure applied. | 1410 | |
| 2 | Stirred in consistometer for 30 min. at 175° F. Packed in flow cell without closure, remained in heat bath at 175° F. for 3 hours. Applied 500 psi closure, cured at 300° F. for 3 hours. | | 1945 |
| 3 | Stirred in consistometer for 1 hour at 175° F. Packed and cured at 300° F. for 3 hours. | 1560 | 1690 |
| 4 | Stirred in consistometer for 1 hour at 175° F. Packed and cured at 300° F. for 3 hours. | 1790 | 1930 |
| 5 | Stirred in consistometer for 1 hour at 175° F. Packed and cured at 300° F. for 3 hours. | 1680 | 1795 |

EXAMPLE 4

The procedure of Example 2 was repeated except that portions of the proppant were dry coated with resin compositions containing varying amounts of hardening agent. Each of the resin coated proppant portions were mixed with portions of a cross-linked 30 pound per gallon linear carboxymethyl guar fracturing fluid and tested as indicated in Example 2.

TABLE IV

Effect Of Varying Amounts Of Liquid Hardening Agent Component On Consolidation and Flow-Back

| Test No. | Volume % Liquid Hardening Agent Component | Cure Time, hrs | Unconfined Compressive Strength, psi | Proppant Flow-Back Amount, grams |
|---|---|---|---|---|
| 1 | 0 | 3 | 6 | None |
| 2 | 0 | 20 | 7 | None |
| 3 | 5 | 3 | 9 | None |
| 4 | 5 | 20 | 22 | None |
| 5 | 10 | 3 | 140 | None |
| 6 | 10 | 20 | 150 | None |
| 7 | 25 | 3 | 425 | None |
| 8 | 50 | 3 | 1155 | None |
| 9 | 100 | 3 | 1680 | None |

As indicated in Table IV, various amounts of liquid hardening agent component ranging from 0 to 100 percent of the initial amount can be mixed with the liquid hardenable resin component to achieve different degrees of rubbery/flexibility and consolidation strengths for the proppant packs. A proppant pack can be transformed into a complete consolidated pack by increasing the amount of liquid hardening agent component above 25 percent, depending on the desired level of consolidation strength and cure time. The consolidation was obtained without any closure stress applied. The flow-back testing was also performed using a flow cell that had a 0.5-inch diameter perforation. Despite of low consolidation strengths, the proppant packs were flexible, yet coherent permeable masses allowing the proppant core samples to withstand high water flow rates simulating high production flow rate wells without producing any proppant from the flow cell (Table IV).

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. An improved method of coating dry proppant particles with a hardenable resin composition and suspending the coated proppant particles in a fracturing fluid, the resin composition hardening and consolidating the resin coated proppant particles into a high strength permeable mass which prevents proppant flow-back after being placed in one or more fractures formed in a subterranean zone comprising the steps of:

(a) providing a liquid hardenable resin component comprising a hardenable resin, a silane coupling agent, a solvent for said resin, one or more hydrolyzable esters for breaking gelled fracturing fluid films on proppant particles, and a surfactant for facilitating the coating of said resin on said proppant particles and for causing said hardenable resin to flow to the contact points between adjacent resin coated proppant particles;

(b) providing a liquid hardening agent component comprising a hardening agent suspended or dissolved in a liquid carrier fluid;

(c) providing a source of dry proppant particles;

(d) providing a gelled liquid fracturing fluid;

(e) pumping said gelled liquid fracturing fluid into said subterranean zone to form one or more fractures therein and to place said hardenable resin composition coated proppant particles in said fractures;

(f) as said fractures are formed in step (e), continuously mixing said liquid hardenable resin component with said liquid hardening agent component on-the-fly to form said hardenable resin composition;

(g) continuously coating said hardenable resin composition produced in step (f) onto dry proppant particles conveyed from said source thereof on-the-fly to form resin composition coated proppant particles;

(h) continuously mixing said resin composition coated proppant particles produced in step (g) with said fracturing fluid pumped in accordance with step (e) on-the-fly whereby said resin composition coated proppant particles are suspended therein;

(i) terminating steps (e), (f), (g) and (h) when said resin composition coated proppant particles have been placed in said one or more fractures; and (j) allowing said hardenable resin composition on said resin composition coated proppant particles to harden and consolidate said proppant particles into one or more high strength permeable packs which prevent proppant particle flow-back.

2. The method of claim 1 wherein said hardenable resin in said liquid hardenable resin component is an organic resin selected from the group consisting of bisphenol A-epichlorohydrin resin, polyepoxide resin, novolak resin, polyester resin, phenol-aldehyde resin, urea-aldehyde resin, furan resin, urethane resin and mixtures thereof.

3. The method of claim 1 wherein said hardenable resin in said liquid hardenable resin component is a bisphenol A-epichlorohydrin resin.

4. The method of claim 1 wherein said silane coupling agent is selected from the group consisting of N-2-(aminoethyl)-3-aminopropyltrimethoxysilane and 3-glycidoxypropyltrimethoxysilane.

5. The method of claim 1 wherein said silane coupling agent is 3-glycidoxypropyltrimethoxysilane.

6. The method of claim 1 wherein said solvent for said resin in said liquid hardenable resin component is selected from the group consisting of methanol, butyl alcohol and N-methyl-2-pyrrolidone.

7. The method of claim 1 wherein said solvent for said resin in said liquid hardenable component is methanol.

8. The method of claim 1 wherein said one or more hydrolyzable esters for facilitating the coating of said resin on said proppant particles and for breaking gelled fracturing fluid films thereon in said liquid hardenable component is selected from the group consisting of a mixture of dimethylglutarate, dimethyladipate and dimethylsuccinate, sorbitol, catechol, dimethyithiolate and ter butylhydroperoxide.

9. The method of claim 1 wherein said one or more hydrolyzable esters for breaking gelled fracturing fluid films on proppant particles in said liquid hardenable component is a mixture of dimethylglutarate, dimethyladipate and dimethylsuccinate.

10. The method of claim 1 wherein said surfactant for facilitating the coating of said resin on said proppant particles and for causing said hardenable resin to flow to the contact points between adjacent resin coated proppant particles is selected from the group consisting of an ethoxylated nonyl phenol phosphate ester and mixtures of one or more cationic surface active agents and one or more non-ionic surface active agents.

11. The method of claim 1 wherein said surfactant for causing said hardenable resin to flow to the contact points between adjacent resin coated proppant particles in said liquid hardenable resin component is an ethoxylated nonyl phenol phosphate ester.

12. The method of claim 1 wherein said hardening agent in said liquid hardening agent component is selected from the group consisting of 4,4'-diaminodiphenyl sulfone, amines, amides, hexachloroacetone, 1,1,3-trichlorotrifluoroacetone, benzotrichloride, benzylchloride and benzalchloride.

13. The method of claim 1 wherein said hardening agent in said liquid hardening agent component is 4,4'diaminodiphenyl sulfone.

14. The method of claim 1 wherein said liquid carrier fluid in said liquid hardening agent component is an aqueous liquid.

15. The method of claim 1 wherein said liquid carrier fluid in said liquid hardening agent component is a xanthan polymer gelled aqueous liquid.

16. The method of claim 1 which further comprises the step of varying the volume ratio of said liquid hardening agent component to said liquid hardenable resin component during the time steps (e), (f), (g) and (h) are carried out.

17. The method of claim 16 wherein the volume ratio of said liquid hardening agent component to said liquid hardenable resin component is varied from an initial volume ratio to a lower volume ratio and then back to said initial volume ratio.

18. The method of claim 17 wherein said initial volume ratio of said liquid hardening agent component to said liquid hardenable resin component is in the range of from about 1:100 to about 1:2 and said lower volume ratio is in the range of from about 0 to about 1:5.

19. The method of claim 17 wherein said initial volume ratio of said liquid hardening agent component to said liquid hardenable resin component is about 1:2 and said lower volume ratio is about 1:10.

20. An improved method of coating dry proppant particles with a hardenable resin composition and suspending the coated proppant particles in a fracturing fluid, the resin composition hardening and consolidating the resin coated proppant particles into a high strength permeable mass which prevents proppant flow-back after being placed in one or more fractures formed in a subterranean zone comprising the steps of:
 (a) providing a liquid hardenable resin component comprising a hardenable resin, a silane coupling agent, a solvent for said resin, one or more hydrolyzable esters for breaking fracturing films on proppant particles, and a surfactant for facilitating the coating of said resin on said proppant particles and for causing said hardenable resin to flow to the contact points between adjacent resin coated proppant particles;
 (b) providing a liquid hardening agent component comprising a hardening agent suspended or dissolved in a liquid carrier fluid;
 (c) providing a source of dry proppant particles;
 (d) providing a gelled liquid fracturing fluid;
 (e) pumping said gelled liquid fracturing fluid into said subterranean zone to form said one or more fractures therein and to place said resin composition coated proppant particles in said fractures;
 (f) as said fractures are formed in step (e), continuously mixing said liquid hardenable resin component with said liquid hardening agent component on-the-fly to form said hardenable resin composition;
 (g) varying the volume ratio of said liquid hardening agent component to said liquid hardenable resin component during step (f);
 (h) continuously coating said hardenable resin composition produced in steps (f) and (g) onto dry proppant particles conveyed from said source thereof on-the-fly to form resin composition coated proppant particles;
 (i) continuously mixing said resin composition coated proppant particles produced in step (h) with said fracturing fluid pumped in accordance with step (e) on-the-fly whereby said resin composition coated proppant particles are suspended therein;
 (j) terminating steps (e), (f), (g), (h) and (i) when said resin composition coated proppant particles have been placed in said one or more fractures; and
 (k) allowing said hardenable resin composition on said resin composition coated proppant particles to harden and consolidate said proppant particles into one or more high strength permeable packs which prevent proppant flow-back.

21. The method of claim 20 wherein said hardenable resin in said liquid hardenable resin component is an organic resin selected from the group consisting of bisphenol A-epichlorohydrin resin, polyepoxide resin, novolak resin, polyester resin, phenol-aldehyde resin, urea-aldehyde resin, furan resin, urethane resin and mixtures thereof.

22. The method of claim 20 wherein said hardenable resin in said liquid hardenable resin component is a bisphenol A-epichlorohydrin resin.

23. The method of claim 20 wherein said silane coupling agent is selected from the group consisting of N-2-(aminoethyl)-3-aminopropyltrimethoxysilane and 3-glycidoxypropyltrimethoxysilane.

24. The method of claim 20 wherein said silane coupling agent is 3-glycidoxypropyltrimethoxysilane.

25. The method of claim 20 wherein said solvent for said resin in said liquid hardenable resin component is selected from the group consisting of methanol, butyl alcohol and N-methyl-2-pyrrolidone.

26. The method of claim 20 wherein said solvent for said resin in said liquid hardenable component is methanol.

27. The method of claim 20 wherein said one or more hydrolyzable esters for breaking gelled fracturing fluid films on proppant particles in said liquid hardenable component is selected from the group consisting of a mixture of dimethylglutarate, dimethyladipate and dimethylsuccinate, sorbitol, catechol, dimethylthiolate and ter butylhydroperoxide.

28. The method of claim 20 wherein said one or more hydrolyzable esters for breaking gelled fracturing fluid films thereon in said liquid hardenable component is a mixture of dimethylglutarate, dimethyladipate and dimethylsuccinate.

29. The method of claim 20 wherein said surfactant for facilitating the coating of said resin on said proppant particles and for causing said hardenable resin to flow to the contact points between adjacent resin coated proppant particles is selected from the group consisting of an ethoxylated nonyl phenol phosphate ester and mixtures of one or more cationic surface active agents and one or more non-ionic surface active agents.

30. The method of claim 20 wherein said surfactant for facilitating the coating of said resin on said proppant particles and for causing said hardenable resin to flow to the contact points between adjacent resin coated proppant particles is selected from the group consisting of an ethoxylated nonyl phenol phosphate ester and mixtures of one or more cationic surface active agents and one or more non-ionic surface active agents.

31. The method of claim 20 wherein said hardening agent in said liquid hardening agent component is selected from the group consisting of 4,4'-diaminodiphenyl sulfone, amines, amides, hexachloroacetone, 1,1,3-trichlorotrifluoroacetone, benzotrichloride, benzylchloride and benzalchloride.

32. The method of claim 20 wherein said hardening agent in said liquid hardening agent component is 4,4'diaminodiphenyl sulfone.

33. The method of claim 20 wherein said liquid carrier fluid in said liquid hardening agent component is an aqueous liquid.

34. The method of claim 20 wherein said liquid carrier fluid in said liquid hardening agent component is a xanthan polymer gelled aqueous liquid.

35. The method of claim 20 wherein the volume ratio of said liquid hardening agent component to said liquid hardenable resin component is varied in step (g) from an initial volume ratio to a lower volume ratio and then back to said initial volume ratio.

36. The method of claim 35 wherein said initial volume ratio of said liquid hardening agent component to said liquid hardenable resin component is in the range of from about 1:100 to about 1:2 and said lower volume ratio is in the range of from about 0 to about 1:5.

37. The method of claim 35 wherein said initial volume ratio of said liquid hardening agent component to said liquid hardenable resin component is about 1:2 and said lower volume ratio is about 1:10.

* * * * *